United States Patent [19]

Corghi

[11] Patent Number: 5,074,347
[45] Date of Patent: * Dec. 24, 1991

[54] SELF-CENTERING DEVICE FOR LOCKING AIRCRAFT WHEEL RIMS

[75] Inventor: Remo Corghi, Corregio Emilia, Italy

[73] Assignee: Corghi S.P.A., Reggio Emilia, Italy

[*] Notice: The portion of the term of this patent subsequent to Nov. 24, 2005 has been disclaimed.

[21] Appl. No.: 874,716

[22] Filed: Jun. 16, 1986

[51] Int. Cl.⁵ .................................................. B60C 25/00
[52] U.S. Cl. ..................................... 157/14; 157/18; 157/21
[58] Field of Search .................. 157/1, 14, 16, 18, 20, 157/21; 269/47, 74, 83, 84

[56] References Cited

U.S. PATENT DOCUMENTS

| | | |
|---|---|---|
| 2,783,830 | 3/1957 | Pozerycki et al. ............ 157/14 X |
| 3,219,077 | 11/1965 | Wright .................... 157/18 |
| 3,219,078 | 11/1965 | Wright .................... 157/18 |
| 4,118,989 | 10/1978 | Wood ..................... 157/14 X |

FOREIGN PATENT DOCUMENTS 46837 10/1983 Italy.
0998142 2/1983 U.S.S.R. .................... 157/14

Primary Examiner—D. S. Meislin
Attorney, Agent, or Firm—Birch, Stewart, Kolasch & Birch

[57] ABSTRACT

A self-centering device for locking aircraft undercarriage wheel rims comprises a hollow telescopic shaft (14, 15) on which a wheel rim (30) is to be mounted, and which is traversed by a slidable rod (16) with which there engages by bilateral engagement at least one coupling member (23) which is provided at the free end of the shaft (14, 15) and is arranged to engage with and disengage from a sliding thrust cone (27) which clamps the wheel rim against a backing cone (127) or (227), the cone and backing cone resting on the outer conical bearing rings (300) associated with the wheel rim (30).

9 Claims, 2 Drawing Sheets

SELF-CENTERING DEVICE FOR LOCKING AIRCRAFT WHEEL RIMS

SUMMARY OF THE INVENTION

This invention relates to a self-centering device which is particularly suitable for securely and correctly locking the tire-supporting wheel rims provided on aircraft undercarriages in general.

Because of the extremely heavy duty to which such tires are exposed, by virtue both of the weight which they have to support and of the high temperature which they attain during landing, it is necessary to remove and remount such tires at very frequent intervals for required checking and replacement. The wheels of said aircraft undercarriages are known to comprise a tubeless tire and an aluminium or other light alloy rim, having a central hole into which the two outer conical rings of the thrust bearings are locked to fix the rim to the undercarriage.

The particular characteristics of such wheels, and the particular type of duty which they perform, make tire removal and replacement particularly problematic. This is because there is the risk of damaging those rim surfaces which seal against the tubeless tire, and because there is also the danger of impairing the active surfaces of said outer conical rings of the thrust bearings, with obvious detrimental results. Said damage risks or dangers also exist for a tire which has simply to have its bead disengaged for inspection and/or checking purposes, and these risks are mainly due to two factors, the first being that currently there are no known machines or equipment specifically designed and constructed for carrying out this task rapidly, reliably and correctly, and the second being that considerable force is required to disengage the beads of said aircraft tires because the high temperature to which the tires are raised causes their beads to bind to the rim.

Basically, according to the known prior art such tires are bead-disengaged, removed and replaced by the use of apparatus which is not only poorly suitable and inconvenient for the aforesaid reasons, but also makes said operations lengthy and laborious, requires the assistance of at least two operators, and is not only unsafe from the point of view of damaging the essential parts of aircraft undercarriage wheels, but has also proved potentially dangerous to the operators themselves.

Consequently, in this sector there is a widely felt need for an apparatus or device able to reliably, rapidly and precisely lock, with the use of only one operator, those aircraft wheel rims which are for example to have their bead disengaged.

The main object of the present invention is to satisfy said requirement by providing a self-centering device which is able to obviate the deficiencies of the known prior art, within the framework of a simple and rational structure.

Said object is attained according to the invention by a device comprising a hollow telescopic shaft on which a wheel rim is to be mounted coaxially, and containing at least two mutually slidable coaxial tubular elements one of which is provided with a fixed cone arranged to act as a support seat for one of the outer conical bearing rings associated with the wheel rim, and the other is provided with an interchangeable sliding thrust cone arranged to act on the other outer conical bearing ring to clamp the rim against said fixed cone.

Said sliding cone and fixed cone form a type of clamp able to securely and precisely lock an aircraft wheel rim, the subsequent tire bead disengagement presenting no problem as the invention is intended to be associated with any known tire removal machine provided with means for rotating a normal self-centering unit, for example the machine described in Italian patent application No. 46837 A/83 filed in the name of the present applicant. According to the invention, the outer said tubular element is fixed at its end to an actuator unit, for example a hydraulic cylinder-piston unit, the rod of which is driven with to-and-fro motion and is inserted into said telescopic shaft, said rod having a bilateral engagement seat for at least one drive tooth provided on the free end of the inner said tubular element. By means of said bilateral engagement, the drive tooth is able alternately to retract into a seat in the inner tubular element to allow the thrust cone to be mounted or withdrawn, and to emerge from said seat in order to engage with and drive said thrust cone.

Furthermore, the outer surfaces of said cone and backing cone are advantageously formed from a relatively soft metal material, for example an aluminium alloy, and the attachment base of the backing cone is provided with a removable ring able to facilitate the demounting of the two opposing coaxial parts which make up a normal aircraft wheel rim.

The characteristics and constructional merits of the invention will be more apparent from the detailed description given hereinafter with reference to the figures of the accompanying drawings, which illustrate a particular preferred embodiment thereof by way of non-limiting example.

Figure 1:
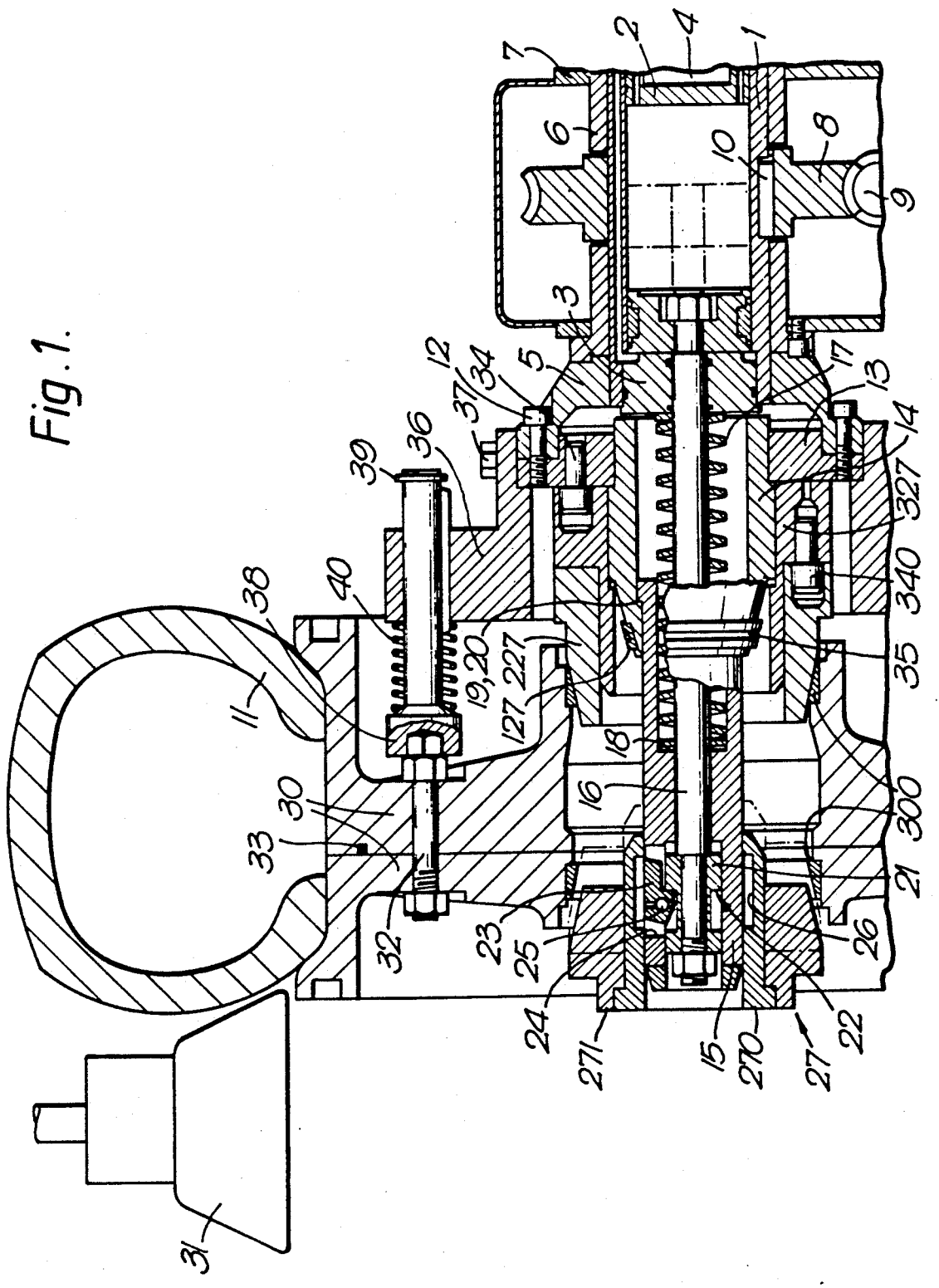
FIG. 1 is a longitudinal section through the invention in its released position, associated with the normal parts of a tire removal machine which are arranged to rotate it for example during bead disengagement.

From said figures, and in particular FIG. 1, it can be seen that the invention comprises a double-acting cylinder-piston unit 1 provided at its rear end 2 with a coaxial hydraulic distributor 4 and at its front end 3 with a surrounding concone ring 5. To avoid descriptive repetition, it should be noted that said hydraulic unit 1 can be mounted on any tire removal machine provided with means for rotating a normal self-centering unit, in place of which the device according to the invention is applied. Consequently the type of arrangement shown must in no way be taken as limiting the scope of the present invention. By way of example, the device according to the invention is particularly convenient for the machine described in the aforesaid document. From FIG. 1 it can be seen that the casing of the hydraulic unit 1 is rotatably mounted, but axially locked, on a strong support 6 which is supported by a box casing 7 housing a helical gear-worm mechanism 8, 9. Said helical gear 9 is keyed by a key 10 on to the casing of the hydraulic unit 1 so as to rotate hydraulic unit 1, for example during bead disengagement of an aircraft tire 11. A centrally bored disc 13 is fixed on to said ring 5 by a circumferential set of bolts 12, and fixedly carries a projecting hollow coaxial cylindrical member 14. In cylindrical member 14 there is slidingly mounted a second hollow cylindrical member 15 with differing inner cross-sections, and in which the rod 16 of the unit 1 is slidingly mounted.

On the rod 16 there is mounted a repositioning spring 17 in the form of a flat-bodied spiral, its opposing ends resting against the end 3 of the unit 1 and, by way of a convenient bearing 18, against the end of the wider rear portion of the cavity in said second cylindrical member 15.

Figure 2:
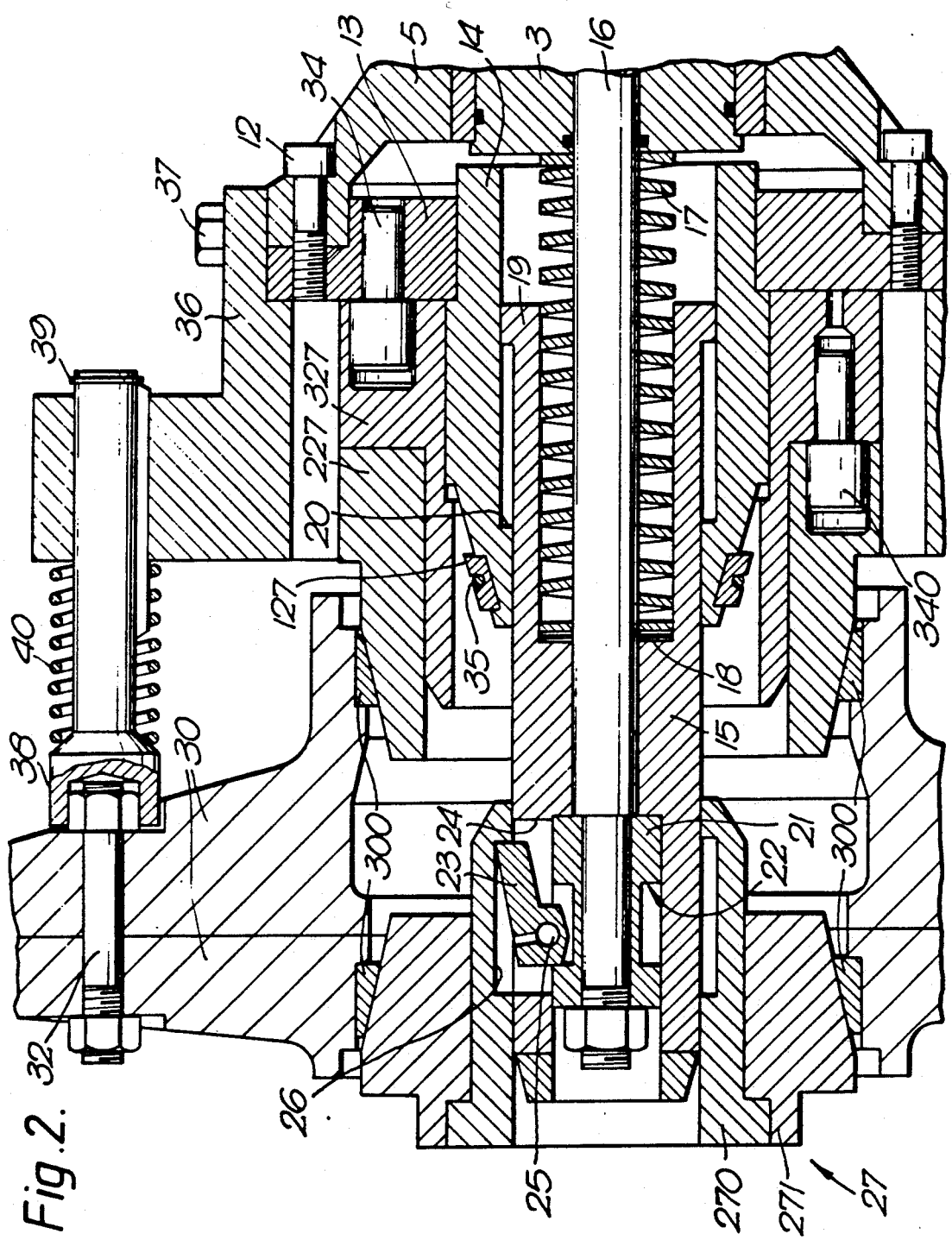
FIG. 2 shows part of the preceding figure to an enlarged scale, with the device shown in its locked position.

As can be seen in FIG. 2, the rear end of cylindrical member 15 is provided with an outer anti-withdrawal rib 19 which abuts against an inwardly directed shoulder 20 provided in said first cylindrical member 14.

As can be seen, on the free end of the rod 16 there is fixed a sleeve 21 comprising an outer circumferential groove 22 which receives the foot or inner portion of at least one drive tooth 23 with sufficient play to allow drive tooth 23 to freely slide axially. Said at least one tooth 23, which is of right-angled configuration, is received in a slotted aperture 24 provided in the wall of the cylindrical member 15, and is pivoted to this latter by a pin 25. When the rod 16 is extended, the tooth 23 is contained within the cross-sectional profile of the cylindrical member 15 (see FIG. 1), whereas when the rod 16 is retracted, the tooth 23 has swivelled outwards (see FIG. 2), where it engages with the front shoulder of an inner circumferential groove 26 provided in an interchangeable thrust cone 27. As can be seen, thrust cone 27 is mounted practically as an exact fit on the cylindrical member 15, and comprises a core 270 of hard material, such as steel, which is covered with a layer 271 of relatively soft metal material such as an aluminium alloy. On the outside of said first hollow cylindrical member 14 there is mounted a backing cone, which corresponds with said thrust cone 27 and cooperates therewith to securely lock the rim 30 of an aircraft wheel, for example to allow the bead of the tire 11 to be disengaged, which can be done by means of a tool of the type indicated by 31 in FIG. 1.

Said rim 30 is formed in the normal manner from two opposing coaxial parts which are joined together by a circumferential set of bolts 32 by way of a gasket 33 which provides a seal between said two parts. Each of said parts, which are constructed of a convenient light alloy such as an aluminium alloy, is associated internally with the outer ring 300 of the corresponding thrust bearing used for mounting the rim 30 on the respective aircraft undercarriage.

The purpose of said thrust cone 27 and backing cone is precisely to lock the rim by way of said outer bearing rings 300, so as to prevent damaging the material of the rim 30.

As can be seen in FIG. 2, for one particular type of rim with a small diameter center hole, the said backing cone consist of a removable frusto-conical ring 127 which is received in a convenient recess provided in the front frusto-conical end of said first cylindrical member 14. When using frusto-conical ring 127 as the backing cone, a second removable ring 227 would not be needed and therefore would be removed and set aside. For mounting and removal reasons, the frusto-conical ring 127 is constructed in two halves which are retained in their seat by a convenient split ring 35 held in a respective circumferential groove formed in the outer surface of said ring 127. For other types of rims with larger diameter center holes, the backing cone consists of second removable frusto-conical ring 227 which is mounted on a flanged sleeve 327, itself mounted on said first member 14, and having a frusto-conical free end. From the figure it can be seen that the sleeve 327 acts as a spacer. The said second removable ring 227 widens into a circumferential flange provided with a bore for receiving a drag peg 340 fixed to the flanged sleeve 327, which is also provided with a seat for receiving a drag peg 34 fixed to the disc 13. For yet other types of rims the flanged sleeve 327 is not required, and the corresponding second removable ring 227 is directly mounted on said first hollow member, by torsional engagement with the peg 34. The rings 127 and 227 are constructed of a relatively soft metal material, such as an aluminium alloy, in order not to damage the rolling surfaces of the outer bearing rings 300. Ring 227 can be removed and replaced with a similar ring of different outside diameter in order to adapt the invention to the sizes of various wheel rims to be mounted thereon.

A tire is mounted onto the invention by activating hydraulic distributor 4, thereby causing rod 16 to slide to the left as shown by the solid lines in FIG. 1. Thrust cone 27 is then removed by an operator, who guides a tire rim onto cylindrical members 14 and 15.

Finally, according to a further characteristic of the invention a unit is provided for aiding the dismantling of the rim 30, and comprises a ring 36 for mounting over said disc 13 and ring 5, where it is fixed by at least one transverse screw 37. The ring 36 extends outwards in the form of a frontal flange on which a circumferential set of retaining sockets 38 are slidingly mounted and axially locked, their number being equal to the number of bolts 32 of the rim 30. The sockets 38 are provided at their front with a spanner socket cup for receiving the head of a bolt 32, and at their rear with an anti-withdrawal stop 39, for example an external Seeger ring. A compression spring 40 is mounted on the shank of the sockets 38 in order to constantly urge the socket into engagement with said head.

When the rim 30 is to be mounted on the telescopic shaft 14, 15, the bolts 32 are moved into alignment with the sockets 38, these latter then withdrawing during the mounting should the heads of the bolts 32 not enter them. This however is of no importance because the heads will automatically enter and thus be retained when an operator unscrews the nut on the other end of each bolt in order to dismante the rim 30.

The invention is not limited to the single embodiment illustrated and described, but includes all technical equivalents of the said means and their combinations, provided they fall within the scope of the following claims.

What is claimed is:

1. A self-centering device for locking aircraft wheel rims on a tire mounting and demounting machine having a rotating shaft which comprises:
   a hollow telescopic shaft on which a wheel rim provided with conical bearing rings is to be mounted, said hollow telescopic shaft having a free end and a base end and being traversed by a slidable coaxial rod having a free end, and means for driving said slidable coaxial rod back and forth in a co-axial direction, said slidable coaxial rod being operatively connected to said free end of the hollow telescopic shaft such that driving said slidable coaxial rod back and forth in the coaxial direction drives said free end of the hollow telescopic shaft back and forth;
   said shaft being provided at said base end with a removable backing cone and at said free end with an interchangeable sliding thrust cone which cooperate with said backing cone to engage with the outer conical bearing rings associated with the wheel rim;

said free end of said slidable coaxial rod having means for locking and unlocking said shaft to said thrust cone.

2. The device as claimed in claim 1, wherein said hollow telescopic shaft comprises a first hollow cylindrical member and a second hollow cylindrical member sliding within the first hollow member, said first hollow member being fixed to a support base and said second hollow member being provided with a widened anti-withdrawal foot, and wherein elastic repositioning means for said second hollow cylindrical member is housed in said first hollow cylindrical member.

3. The device as claimed in claim 1, wherein said slidable coaxial rod is a rod of a hydraulic cylinder-piston unit, and wherein said free end of said slidable coaxial rod is fixed to said hollow telescopic shaft.

4. The device as claimed in claim 1, wherein said backing cone comprises a frusto-conical ring which is mounted on one end of said first hollow member.

5. The device as claimed in claim 4, wherein said ring is constructed of a relatively soft metal material.

6. The device as claimed in claim 5, wherein said soft metal material is an aluminium alloy.

7. The device as claimed in claim 1, wherein said sliding thrust cone comprises a core of a hard metal material and having an inner cylindrical surface, and an outer covering layer formed from a relatively soft metal material and wherein a groove is provided on said inner cylindrical surface of said core.

8. The device as claimed in claim 1, wherein said means for alternately engaging and disengaging from said thrust cone comprises at least one profiled tooth received in a slotted aperture in said second hollow cylindrical member, pivoted to said second cylindrical member by a pin, and having a portion which is received, with a certain degree of play, to allow free axial sliding in a circumferential groove provided in a sleeve fixed to said free end of said rod.

9. The device as claimed in claim 2, wherein said support base of said hollow telescopic shaft is surrounded by a removable flanged ring which is circumferentially provided with a set of equidistant retaining sockets having spanner socket cups which face in the direction of said free end of said shaft and being elastically loaded in the same direction and being slidingly mounted yet torsionally locked on said flanged ring.

* * * * *